(12) United States Patent
Huang et al.

(10) Patent No.: US 11,352,215 B2
(45) Date of Patent: Jun. 7, 2022

(54) TURNING DRIVING DEVICE

(71) Applicant: USUN TECHNOLOGY CO., LTD., Taoyuan (TW)

(72) Inventors: Chiu-Fong Huang, Taoyuan (TW); Hsiang-Yueh Yu, Taoyuan (TW)

(73) Assignee: USUN TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 17/171,175

(22) Filed: Feb. 9, 2021

(65) Prior Publication Data

US 2021/0269252 A1  Sep. 2, 2021

(30) Foreign Application Priority Data

Feb. 27, 2020 (TW) ................................. 109106542

(51) Int. Cl.
*B65G 47/244* (2006.01)
*B65G 13/10* (2006.01)
*B65G 47/54* (2006.01)
*B65G 13/02* (2006.01)

(52) U.S. Cl.
CPC .......... *B65G 47/244* (2013.01); *B65G 13/10* (2013.01); *B65G 47/54* (2013.01); *B65G 13/02* (2013.01)

(58) Field of Classification Search
CPC ...... B65G 47/54; B65G 47/244; B65G 13/10; B65G 13/02; B65G 13/065
USPC ............ 198/782, 370.09, 371.3; 193/35 MD
See application file for complete search history.

(56) References Cited

U.S. PATENT DOCUMENTS

| | | | | | |
|---|---|---|---|---|---|
| 3,978,975 | A | * | 9/1976 | Herbes | B64D 9/00 198/782 |
| 4,589,542 | A | * | 5/1986 | Steadman | B64D 9/00 198/782 |
| 7,673,738 | B2 | * | 3/2010 | McConnell | B64D 9/00 198/782 |
| 9,248,981 | B1 | * | 2/2016 | Skoretz | B65G 47/71 |
| 10,493,927 | B1 | * | 12/2019 | Widmer | B64F 1/322 |

FOREIGN PATENT DOCUMENTS

CA      2373692    *   8/2003   .......... B65G 47/244

* cited by examiner

*Primary Examiner* — James R Bidwell
(74) *Attorney, Agent, or Firm* — Muncy, Geissler, Olds & Lowe, PC

(57) ABSTRACT

A turning driving device includes a directional motor, and a wheel hub motor module and a driving device disposed above and below the directional motor, respectively. The directional motor includes a rotation shaft, and the wheel hub motor module includes a fixing frame, and a roller rotatable about a horizontal fixed axle. The fixing frame is mounted with the fixed axle, and the rotation shaft is combined with a bottom of the fixing frame. The driving device includes a control module electrically connected to the directional motor and the wheel hub motor module. When the control module outputs and transmits a control signal to the directional motor and the wheel hub motor module, the rotation shaft drives the fixing frame to horizontally turn to a preset angular position, and the roller is driven to vertically rotate to drive the article to move toward a predetermined direction.

7 Claims, 10 Drawing Sheets

TURNING DRIVING DEVICE

This application claims the priority benefit of Taiwan patent application number 109106542, filed on Feb. 27, 2020.

BACKGROUND OF THE INVENTION

1. Field of the Invention

The present invention provides a turning driving device, more particularly to a turning driving device applied on a branching position of a conveying platform in a conveying apparatus to sort articles.

2. Description of the Related Art

In recent years, the existing sorting system used in the conveying apparatus is located at the turning point or branching point of an article conveying platform, and the sorting system can guide articles to predetermined positions based on predetermined paths or quickly sort the articles, and the conventional sorting methods can be divided into a forced-turning sorting method, a linked-roller sorting method and a differential-roller sorting method.

In the forced-turning sorting method, traditionally, a pendulum plate is used to force the article to move toward the desired conveying platform when an article is conveyed to the branching point on the conveying platform. However, the forced-turning sorting method is hard to be used in the current era of unmanned factories with automated productions because the conveyed article easily hits the side of the conveying platform during conveying process. The forced-turning sorting method is generally used in the conveying apparatus for conveying trunks or package boxes. Therefore, this sorting system using the forced-turning sorting method is only used for the article which is hard to be permanently broken or damaged, and when the sequentially-conveyed articles are stuck in the turning position of the conveying platform, the conveying apparatus in operation may be stuck, unable to move and then stopped, and it even causes damage of the conveying apparatus or articles and results in huge loss. It can be understood that if the machine of an unmanned factory is shut down and cannot be used, it will cause serious loss of tangible or intangible resources.

The second sorting method is the linked-roller sorting method. The sorting system using linked-roller sorting method includes multiple rows of linked roller modules, and a complex linkage structure is used to pull the linked roller modules to horizontally rotate and respectively swing toward different angles at the same time, and a plurality of transmission shafts are respectively disposed between the adjacent two of the roller modules, and the transmission shafts are driven by motor belts. The outer surface of each transmission shaft is abutted between the adjacent two linked roller modules, and when an article is at the turning point or branching point of the conveying platform, the article contacts the linked roller modules and turns, and the transmission shaft is used to link the rollers of the adjacent roller modules to rotate, to drive movement of the article, so that the articles are moved towards the specific conveying direction of the branch on the conveying platform. It can be understood that when the linked-roller sorting method is applied to the conveying apparatus having the branch path with an excessive angle or with an angle close to 90 degrees, the transmission shaft is unable to rotate to a large angle because the transmission shaft contacts the adjacent linked rollers at the same time, so usage of the linked-roller sorting method is limited by the turning angle and the conveyor apparatus using the linked-roller sorting method requires more installation space to solve above-mentioned problem. Furthermore, the overall structural design complexity of above-mentioned scheme is quite high, and when the linked-roller sorting method is applied to different conveying apparatus with different shape or different numbers of branch paths, the acting structures and linkage type of all roller modules must be redesigned, and the drive control program is complicated and not simple, and the overall maintenance of the system is difficult, the system is difficult to assemble and has high cost, and sharing the roller module in the system is not possible.

In the differential-roller sorting method, each module has three roller assemblies and use motors to drive the rollers configured in an inverted-Y arrangement to generate differential motion, that is, the power rollers in three different directions are driven to vertically rotate in different directions and speeds, to turn the article horizontally and move the article forward different directions at the same time, so that the article is moved toward a specific branching direction on the conveying platform. In this way, when the article is conveyed to the branching point on the conveying platform, each set of differential rollers must determine a matching state of the rotation speeds of the differential rollers according to the variable factors such as the weight, friction coefficient, shape and size of the article. If the article is too heavy, the conveying speed is slow because the single differential roller module is unable to turn horizontally, and it results in longer action time and slower conveying speed, which are not conducive to the conveying apparatus for mass fast production. Furthermore, the overall structure of the differential roller module is complex and the drive control program is complicated and not streamlined, and when being used on different conveying apparatus, the differential roller must continuously rotate forwardly or reversely according to the actual situation, and such operation may cause damage and high maintenance cost of the roller, and the application scope of this method is also limited.

It can be understood that the aforementioned three existing sorting methods for the conveying apparatus need extremely precise control and adjustment in the conveying path planning for different articles to be conveyed. However, under the current unmanned automated production mode which require simple and fast process, the sorting system must be simple, reliable, fast, easy to repair, not easy to damage and also have low cost to meet requirements of the current unmanned automated production, and the sorting system also must be not easy to cause damage of the conveyed article, the conveying apparatus or machine. Therefore, in the era of unmanned factory with automated production, how to develop a sorting system which can be easily applied to different conveying apparatus, or can be repaired, maintained or replaced completely in a very short time, is a key issue in the industry.

SUMMARY OF THE INVENTION

In order to solve the conventional technical problem, the inventors develop a turning driving device according to collected data, multiple tests and modifications, and years of experience in the industry.

An objective of the present invention is that a turning driving device includes a wheel hub motor module and a driving device respectively disposed above and below a directional motor, and when the driving device outputs and transmits a control signal to the directional motor and the wheel hub motor module, a rotation shaft of the directional motor drives a fixing frame of the wheel hub motor module located above to horizontally turn to a preset angular position, and the wheel hub motor module drives a roller to vertically rotate to drive the article, which is placed on the roller, to move toward a predetermined direction; in this way, the turning driving device can be implemented by a single modularized design, in which the directional motor drives the wheel hub motor module to horizontally turn and the wheel hub motor module drives the roller to vertically rotate to convey the article, so as to achieve the effect of simple structure, small assembly space and low cost.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
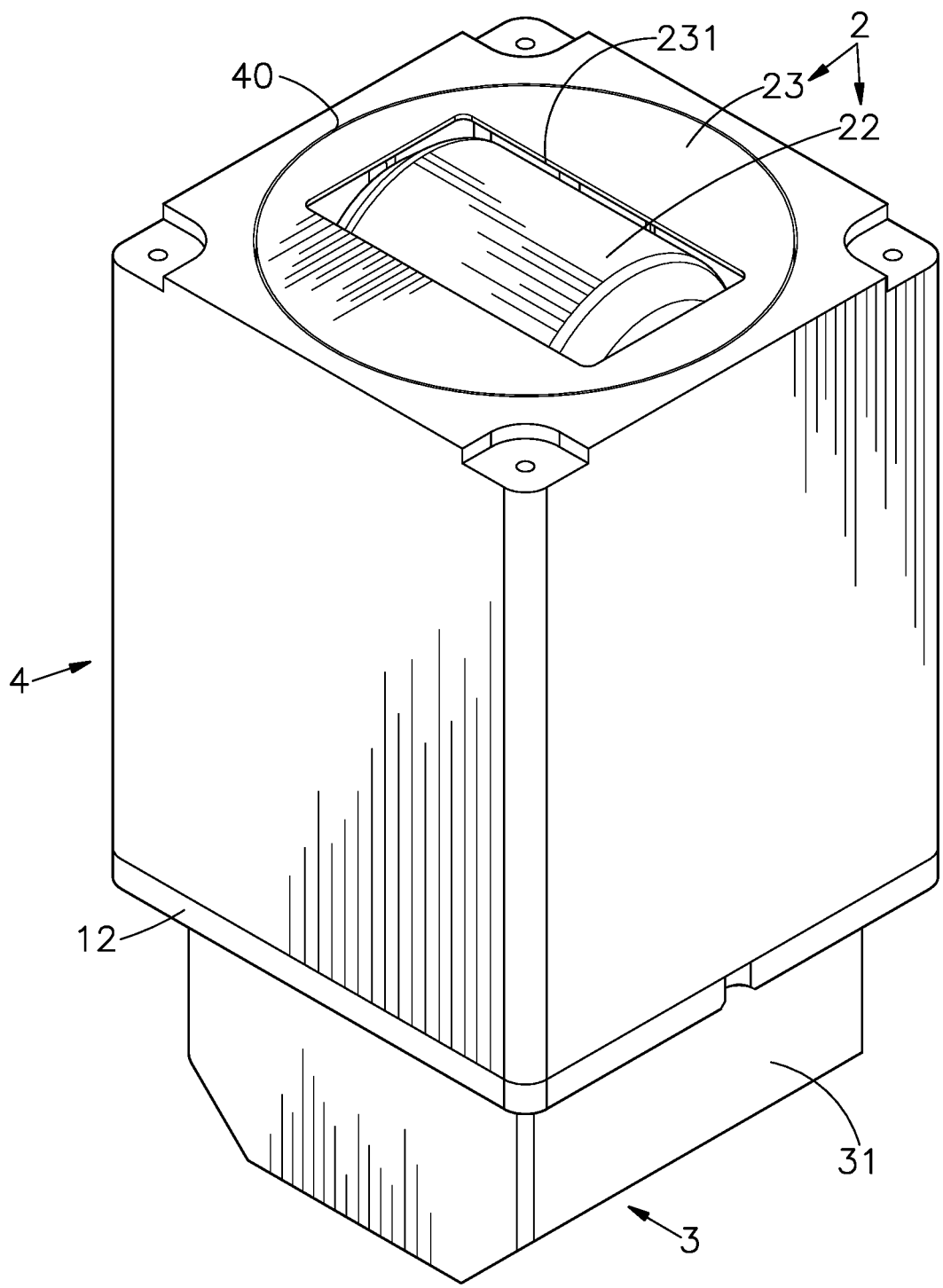
FIG. 1 is a perspective view of a turning driving device, according to a preferred embodiment of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including" will be acknowledged to imply the inclusion of stated elements but not the exclusion of any other elements.

Figure 2:
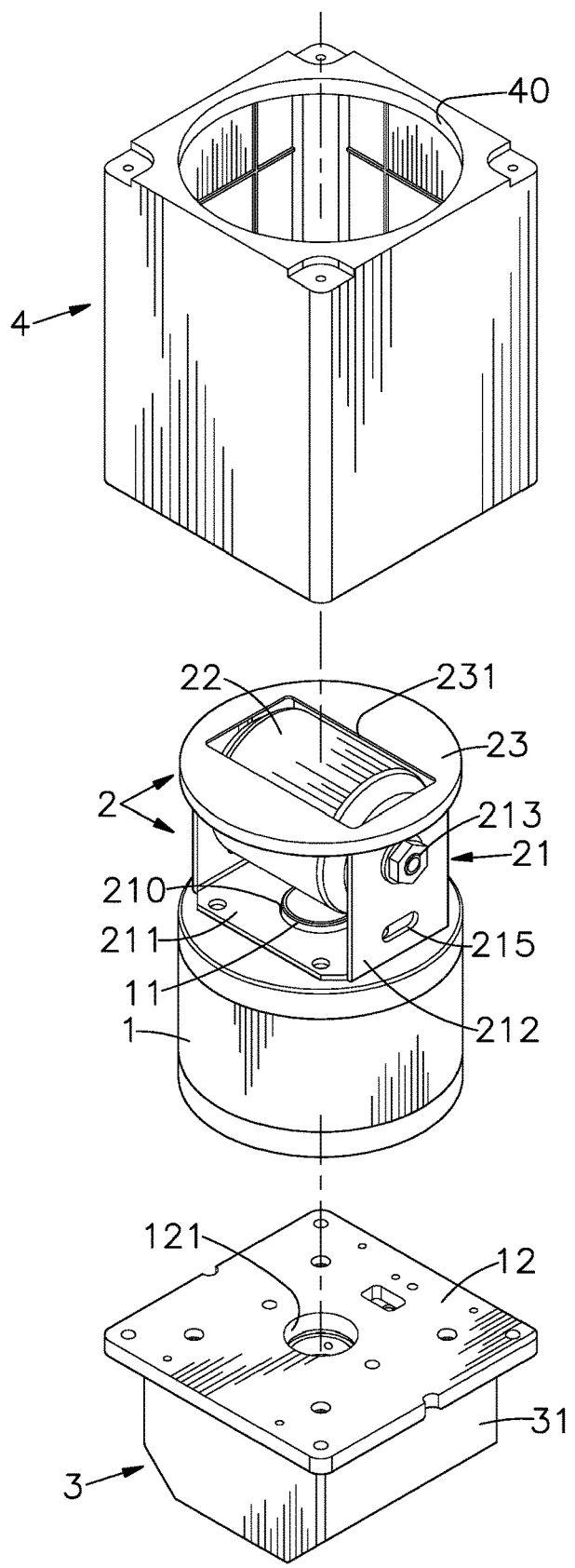
FIG. 2 is a perspective exploded view of a turning driving device, according to a preferred embodiment of the present invention.
Figure 3:
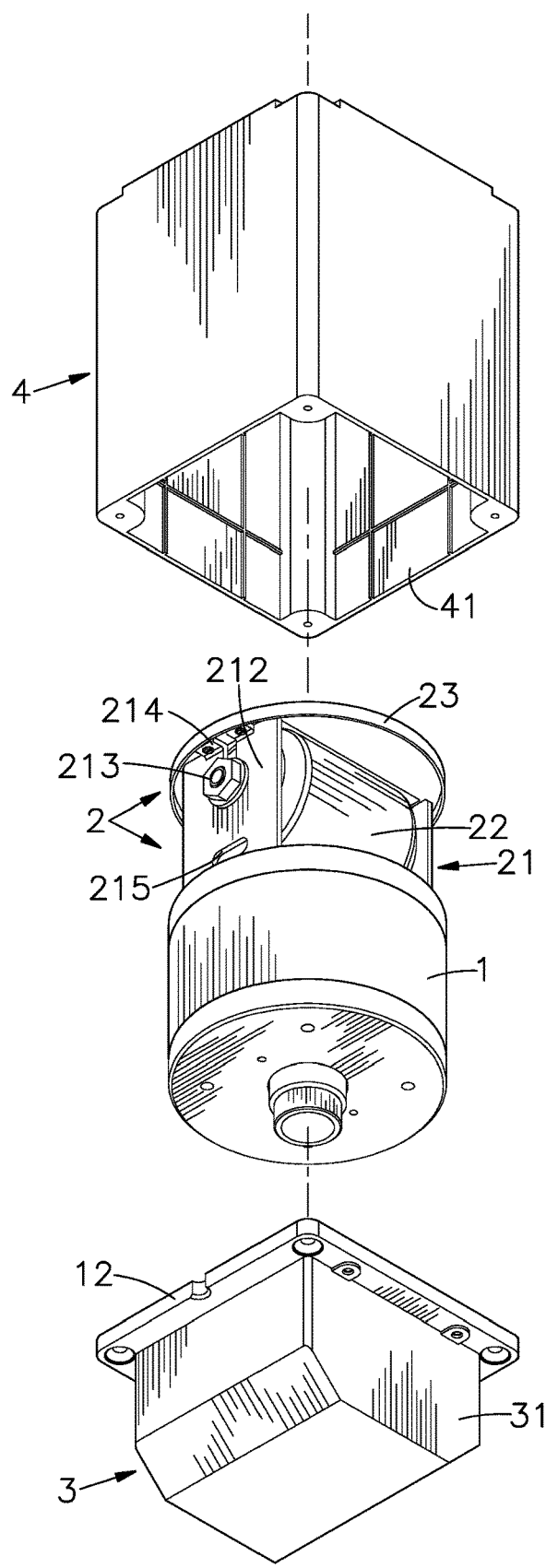
FIG. 3 is a perspective exploded view of a turning driving device when viewed from another angle, according to a preferred embodiment of the present invention.
Figure 4:
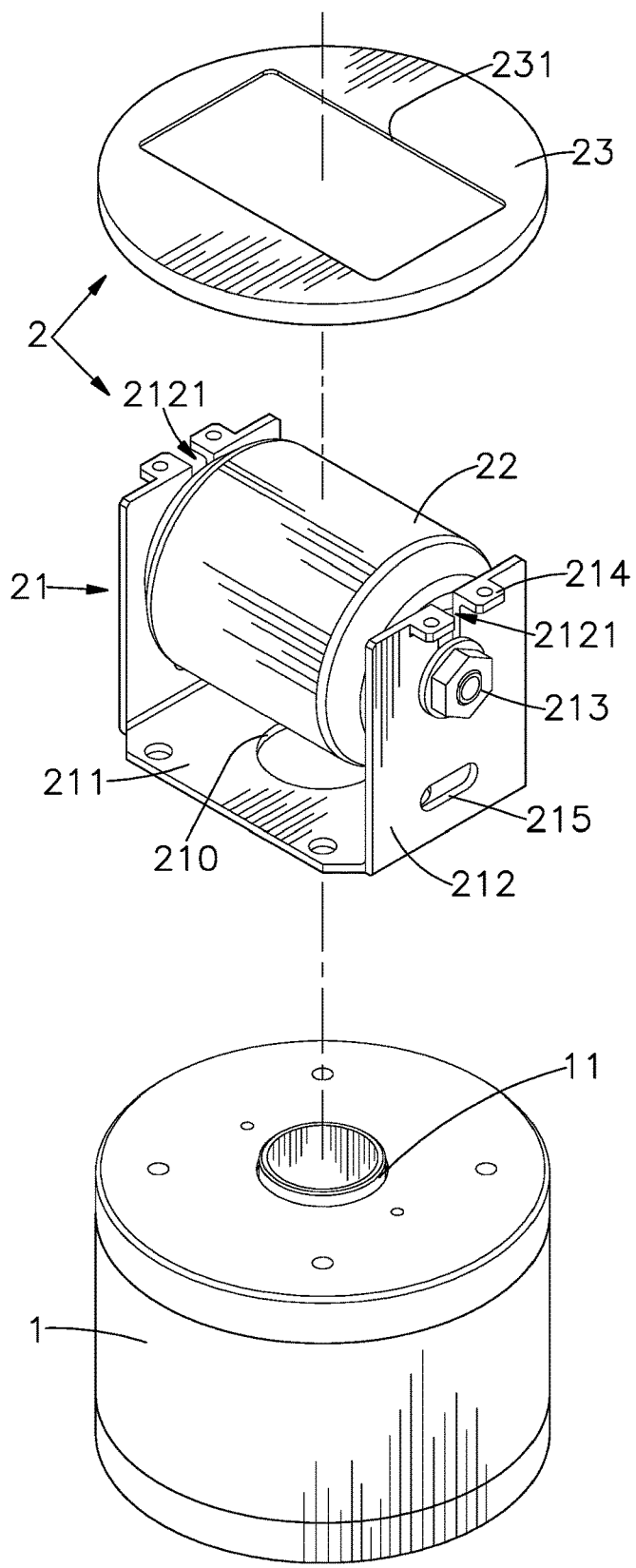
FIG. 4 is a perspective exploded view of a wheel hub motor module, according to a preferred embodiment of the present invention.

Please refer to FIGS. 1 to 6, which are a perspective view of a turning driving device, a perspective exploded view of the turning driving device, an another perspective exploded view of the turning driving device when viewed from another angle, a perspective exploded view of a wheel hub motor module, another perspective exploded view of FIG. 4 when viewed from another angle, and a sectional side view of a turning driving device, according to a preferred embodiment of the present invention. As shown in FIGS. 1 to 6, the turning driving device of the present invention includes a directional motor 1, and a wheel hub motor module 2 and a driving device 3 disposed on and under the directional motor 1, respectively. The driving device 3 is configured to drive operations of the directional motor 1 and the wheel hub motor module 2.

The directional motor 1 includes a rotation shaft 11 rotatable in a vertical direction, a rectangular base 12 combined with a bottom of a case of the directional motor 1, and the base 12 has a pass hole 121 formed on a central part thereof, and a lower part of the rotation shaft 11 is extended out of the case and through the pass hole 121 to combine with a shaft anti-drop component 111, so as to prevent the rotation shaft 11 from dropping during rotation. In an embodiment, the directional motor 1 can be a servo motor, a stepper motor or other motor capable of positioning a rotational angle thereof, and the rotation shaft 11 of the directional motor 1 is in a rotor structure, a stator structure is connected to a bracket or an end plate of the case to form a rotating part of the rotation shaft 11. In an embodiment, the rotation shaft 11 can be a hollow shaft, and the rotation shaft 11 has a through hole 112 formed on a lower part thereof, so that a cable connected to a control circuit can be inserted through the through hole 112 and out of the shaft. In an embodiment, the manner and function of controlling and detecting the motor driving status, for example, the manner of applying multiple Hall ICs or sensor control circuits to control the motor to rotate forwardly or backwardly, reset (that is, rotate to an original point), step to specified point and then apply fixed excitation, and the functions of activating buffer for motor protection, stopping buffer, activating overload protection, current limit protection or alarm, or emergently stopping motor, are well known conventional and optional technologies for the persons skilled in the art, so the details are not repeated herein, and various equivalent structural changes, alternations or modifications based on the descriptions and figures of present invention are all consequently viewed as being embraced by the spirit and the scope of the present invention set forth in the claims.

The wheel hub motor module 2 is disposed on the case of the directional motor 1, and includes a fixing frame 21, and at least one roller 22 rotatable about a horizontal fixed axle 221, and a dust-proof cover 23 combined on the fixing frame 21. In a preferred embodiment, the roller 22 and the fixed axle 221 form a wheel hub motor, and the wheel hub motor used in this embodiment is a known technology. The roller 22 of the wheel hub motor is connected to the case to form a rotor structure, and the fixed axle 221 surrounded by the central part of the roller 22 has two ends mounted on the fixing frame 21 to form the stator structure configured to provide the roller 22 to rotate. In an embodiment, the fixed axle 221 can be a hollow axle, and the fixed axle 221 has a through hole 222 formed on a side thereof, so that a cable connected to a control circuit can be inserted through the through hole 112 and out of the axle.

The operation of an outer rotor, in which a rotor is located on an outer ring, of the wheel hub motor module 2 is opposite to the operation of an inner rotor, in which a rotor is located on an inner ring, of the directional motor 1, and the manners and functions of driving and controlling the wheel hub motor and detecting status of the wheel hub motor, for example, the manners of applying multiple Hall ICs or sensor control circuits to drive the motor to rotate forwardly or backwardly, stop or control speed of the motor, and the functions of activating buffer for motor protection, stopping buffer, activating overload protection, current limit protection or alarm, or emergently stopping the motor, are well known and optional technology for the persons skilled in the art.

Furthermore, the wheel hub motor is also called an in-wheel motor in the industry, and the detail description is not repeated herein. Various equivalent structural changes, alternations or modifications based on the descriptions and figures of present invention are all consequently viewed as being embraced by the spirit and the scope of the present invention set forth in the claims.

Figure 5:
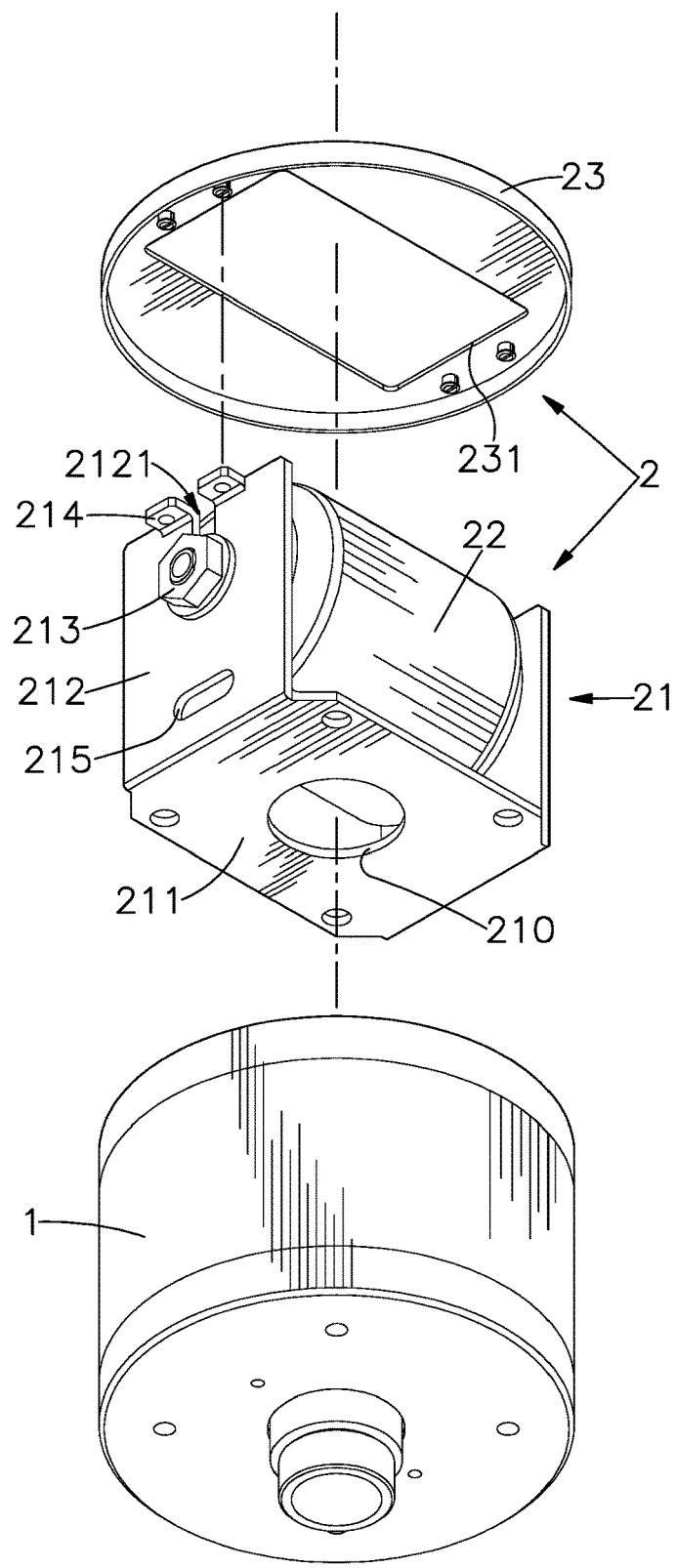
FIG. 5 is a perspective exploded view of FIG. 4 of the present invention, when viewed from another angle.
Figure 6:
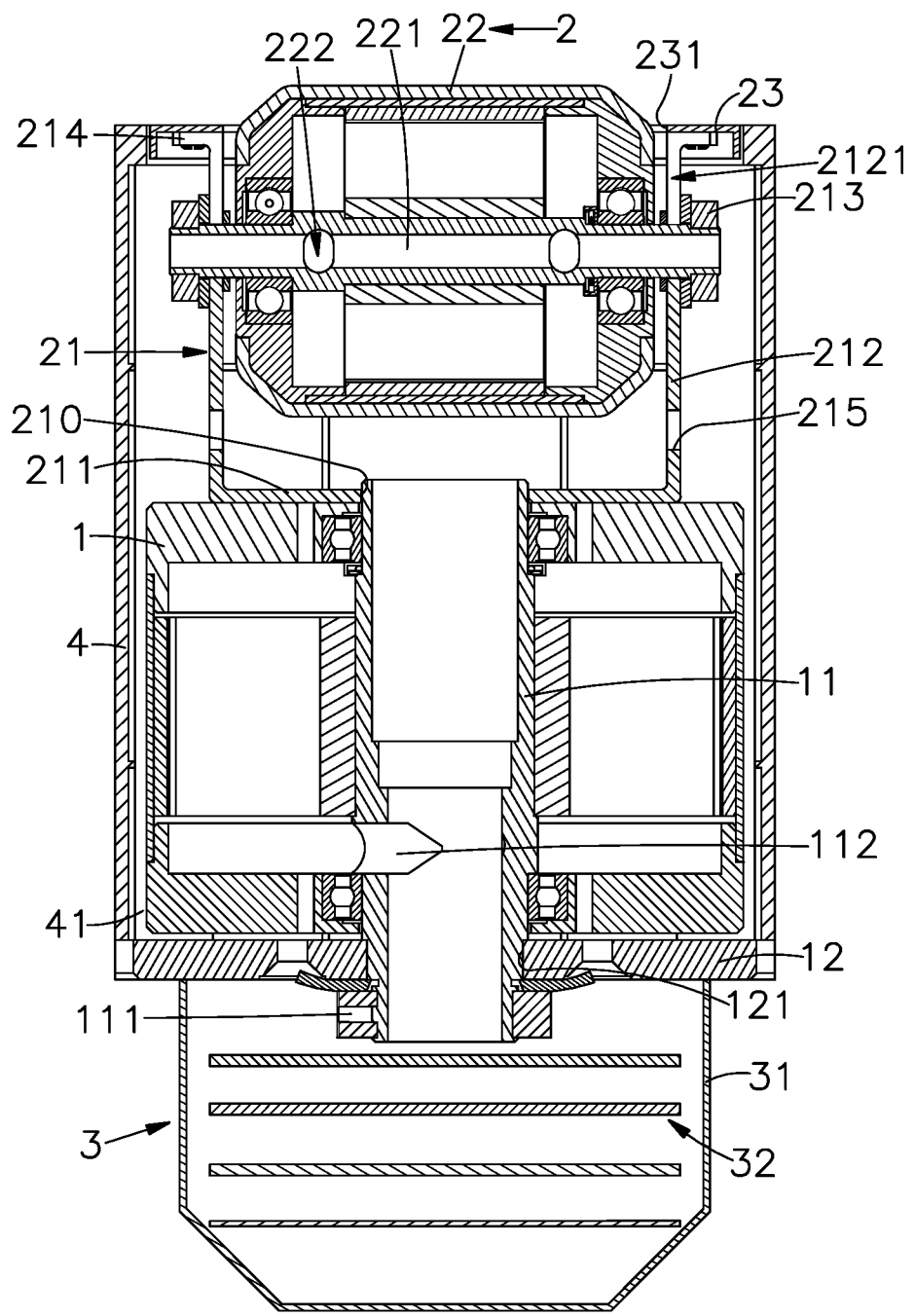
FIG. 6 is a sectional side view of a turning driving device, according to a preferred embodiment of the present invention.
Figure 7:
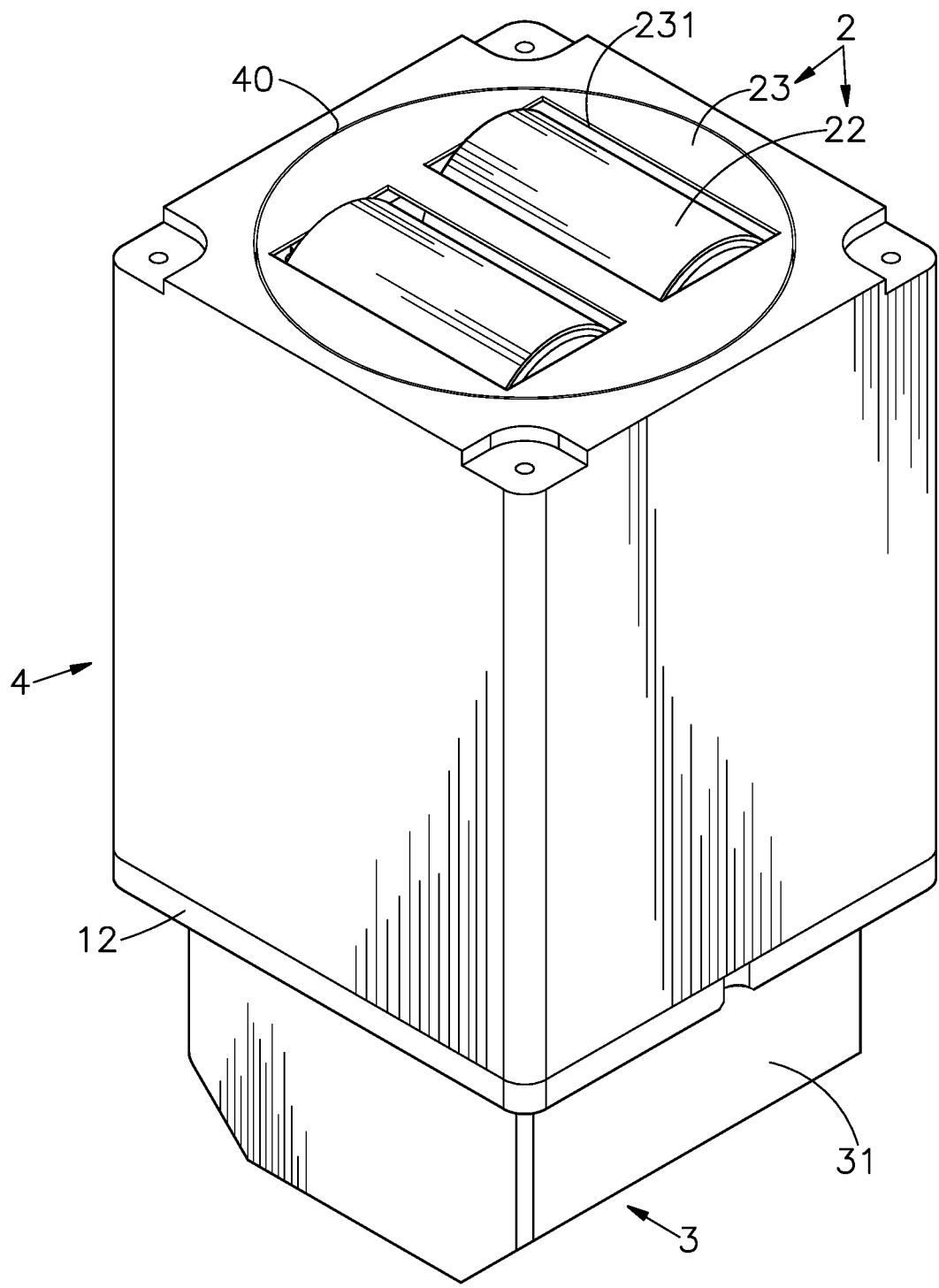
FIG. 7 is a perspective view of a turning driving devices, according to another preferred embodiment of the present invention.
Figure 8:
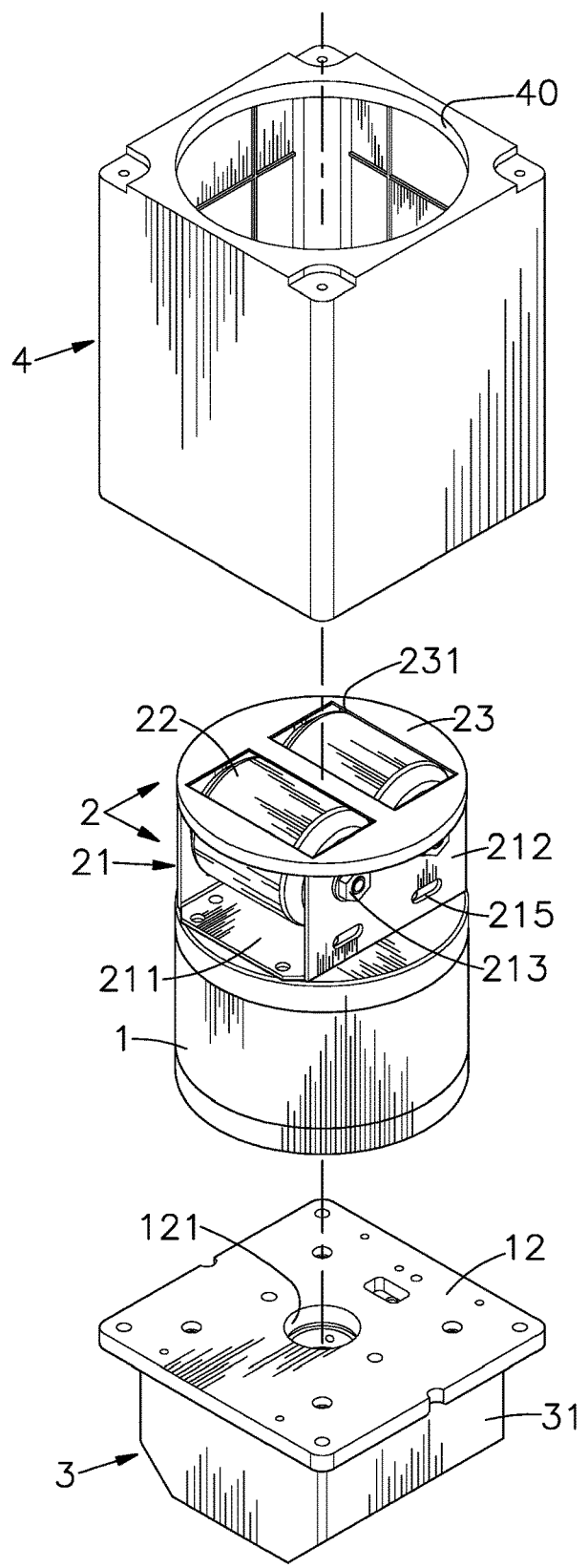
FIG. 8 is a perspective exploded view of a turning driving devices, according to another preferred embodiment of the present invention.
Figure 9:
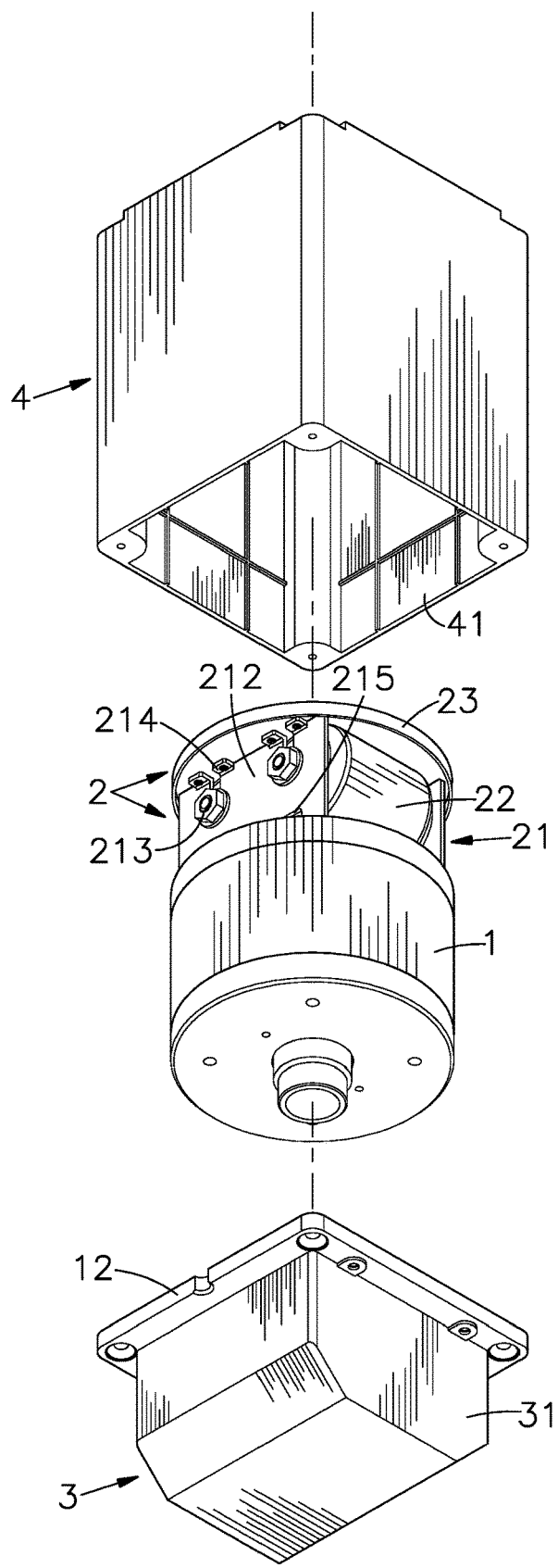
FIG. 9 is a perspective exploded view of a turning driving devices when viewed from another angle, according to another preferred embodiment of the present invention.
Figure 10:
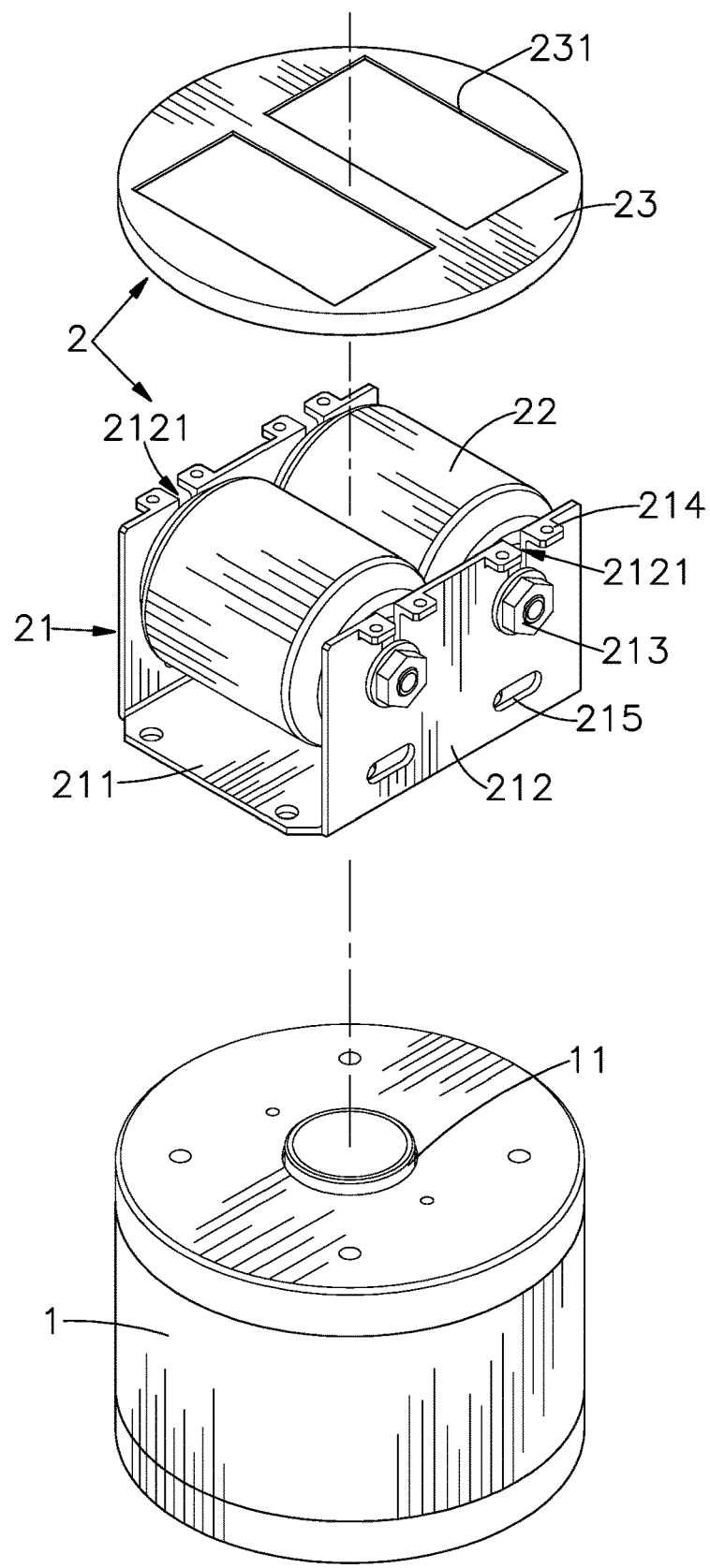
FIG. 10 is a perspective exploded view of a wheel hub motor module, according to another preferred embodiment of the present invention.

As shown in FIGS. 4 and 5, the fixing frame 21 includes a bottom plate 211 disposed a bottom thereof, a fixing hole 210 formed on a central part of the bottom plate 211 and configured to combine with the rotation shaft 11, two side plates 212 upwardly extended from two sides of the bottom plate 211, shaft locking components 213 respectively disposed on the two side plates 212, and fixing plates 214 respectively bent from the top edges of the two side plates 212. Each side plate 212 has a locating hole 2121, and a hole 215 formed below the locating hole 2121 and configured to pass the cable of the wheel hub motor. The two ends of the fixed axle 221 surrounded by the center of the roller 22 are respectively mounted in the locating holes 2121 through the shaft locking components 213, to make the outer top surface of the roller 22 higher than the top of each side plate 212, so that the roller 22 can be exposed to drive the article, which place on the top of the roller 22, to move. The dust-proof cover 23 is combined on the fixing frame 21 through the fixing plates 214, and the dust-proof cover 23 has an exposure hole 231 formed on a surface thereof and configured to expose the outer surface of the roller 22. In an embodiment, the dust-proof cover 23 can be designed as a structure covering the outer side of the fixing frame 21 and exposing a part of the roller 22; in an embodiment, the dust-proof cover 23 can be omitted or be formed integrally with the fixing frame 21, and various equivalent structural changes, alternations or modifications based on the descriptions and figures of present invention are all consequently viewed as being embraced by the spirit and the scope of the present invention set forth in the claims.

The driving device 3 is disposed under the directional motor 1, and the driving device 3 includes a motor control box 31 combined with the bottom of the base 12, and a control module 32 mounted inside the motor control box 31. In an embodiment, the control module 32 can be a DC brushless motor driver board or a controller. The control module 32 is electrically connected to the directional motor 1 and the control circuit of the wheel hub motor module 2 through the cable which passes through the rotation shaft 11 and the fixed axle 221, so that the external power source can be connected to the driving device 3 to supply power, and the driving device 3 can control the rotation shaft 11 and the roller 22 to rotate.

As shown in FIGS. 2 and 3, the outer sides of the directional motor 1 and the wheel hub motor module 2 are covered by a hollow rectangular quick release motor housing 4, and the quick release motor housing 4 has an accommodation hole 40 formed on a top thereof and configure to expose the dust-proof cover 23, and an opening 41 formed on a bottom thereof and configured to combine with the top of the base 12.

The rotation shaft 11 of the directional motor 1 is fixed in the fixing hole 210 of the bottom plate 211 on the fixing frame 21 of the wheel hub motor module 2, the fixed axle 221 of the roller 22 is mounted between the two side plates 212, and the dust-proof cover 23 is combined on the fixing frame 21, so that a part of the outer surface of the roller 22 is exposed out of a top of the exposure hole 231. The directional motor 1 and the driving device 3 are electrically connected to the control module 32 of the driving device 3 through cables, so that the directional motor 1 of the turning driving device of the present invention is able to drive the wheel hub motor module 2 to turn, and the wheel hub motor module 2 is able to drive the roller 22 to vertically rotate to drive the article on the conveying platform to move. Furthermore, the turning driving device can be further modularized and the modularized turning driving device can be installed in the conveying apparatus or a sorting system to provide more applications.

When the present invention is in use, the conveying platform uses a conveyor or a roller to convey articles to move toward the main conveying direction in sequential order, and when the article has entered or not entered the position on the turning driving device, the control module 32 of the driving device 3 can output and transmit the control signal to the directional motor 1 and the wheel hub motor module 2 through cables. When the control circuit of the directional motor 1 receives rotational angle information contained in the control signal, the control circuit drives the rotation shaft 11 to further turn the fixing frame 21, so that the wheel hub motor module 2 is horizontally turned to the preset angular position stably, for example, the wheel hub motor module 2 can be driven to turn leftwardly or rightwardly (such as in a range between −180 degrees to 180 degree) from an original point, which is 0 degree and means the straight movement direction. After the control circuit of the wheel hub motor module 2 receives the control signal, the control circuit of the wheel hub motor module 2 drives the roller 22 to vertically rotate, so that the article placed on the roller 22 is driven to continuously move toward the predetermined direction. In practical application, a plurality of turning driving devices can be disposed on the conveying platform and arranged side by side to form a module array in a predetermined shape, so that the module array can convey the articles at the turning point or the branching point on the conveying platform. The directional motor 1 of each turning driving device is able to drive the rotation shaft 11 to turn the wheel hub motor module 2 to the preset angular position, so that the rotation angle of the wheel hub motor module 2 is not limited and the wheel hub motor module 2 can drive the roller 22 to directly guide the article to quickly move toward the predetermined direction.

In a preferred embodiment, the directional motor 1 and the wheel hub motor module 2 are electrically connected to the control module 32 of the driving device 3 through cables, respectively, but the present invention is not limited to this embodiment. For example, a first connection end can be disposed below the rotation shaft 11 of the wheel hub motor module 2 and configured to connect the cable, and a second connection end can be disposed on the motor control box 31; preferably, the first connection end and the second connection end can be implemented by a pin-type plug and a socket connector which are connected to or detached from each other to form a detachable electrical connection between the directional motor 1, the wheel hub motor module 2 and the driving device 3. In an embodiment, a cable connector or a general edge connector of a circuit board can be directly inserted into the corresponding connector on the motor driver board or a connector of the controller, so as to form electrical connection. In an embodiment, an anti-mistaking locating structure can be used to provide anti-mistaking locating effect in the mated connection process. Various equivalent structural changes, alternations or modifications based on the descriptions and figures of present invention are all consequently viewed as being embraced by the spirit and the scope of the present invention set forth in the claims.

Please refer to FIGS. 7 to 10, which are a perspective view, a perspective exploded view, and another perspective exploded view in different view angle, of a turning driving device, and a perspective exploded view of a wheel hub motor module, according to another preferred embodiment of the present invention. According to the preferred embodiment of the present invention shown in FIGS. 7 to 10, the wheel hub motor module 2 of the turning driving device further includes another roller 22 rotatable about the horizontal fixed axle 221, and two ends of the fixed axle 221, which is surrounded by the central parts of the two rollers 22, are combined in the locating holes 2121 on the two side plates 212 of the fixing frame 21, respectively, and a part of the outer surface of each of the two rollers 22 is exposed out of the exposure hole 231 of the dust-proof cover 23, and the two rollers 22 are rotated synchronously to drive the article, which is located on the two rollers, to move. Various equivalent structural changes, alternations or modifications based on the descriptions and figures of present invention are all consequently viewed as being embraced by the spirit and the scope of the present invention set forth in the claims.

According to above-mentioned content, in the turning driving device of the present invention, the directional motor 1 can receive the rotational angle information contained in the control signal outputted from the driving device 3, and the rotation shaft 11 further drives the fixing frame 21, so that the wheel hub motor module 2 is horizontally turned to the preset angular position. Furthermore, the directional motor 1 is activated only for the turning operation of the wheel hub motor module 2, the usage rate of the directional motor 1 is lower, and the directional motor 1 can turn to the specified angular position without cooperating with complex mechanism for the turning operation, so that it is not easy to cause damage of the motor or mechanism, the service life of the whole device can be extended. The modularized design of the turning driving device is helpful for the site operator to quickly install or remove the turning driving device, so that the period of stopping or interrupting the production line for assembling or repairing operation can be greatly shortened. As a result, the present invention can provide effects of simple structure, small overall assembly space and low cost.

Furthermore, the wheel hub motor module 2 disposed on the directional motor 1 has advantages of low rotation speed, high torque and high efficiency, and the wheel hub motor module 2 can receive the control signal outputted from the driving device 3 and drive the roller 22 to directly guide the article correctly to move forward the predetermined direction quickly. When being applied to the different conveying apparatus, a plurality of turning driving devices can be arranged side by side to form an array or a geometry arrangement assembly with different amount of the plurality of turning driving devices or in a predetermined shape on the conveying platform, so as to meet the shape, angle or path (such as the turning point or the branching point) of different conveying platform in use. As a result, the present invention can provide wide applicability.

The present invention disclosed herein has been described by means of specific embodiments. However, numerous modifications, variations and enhancements can be made thereto by those skilled in the art without departing from the spirit and scope of the disclosure set forth in the claims.

What is claimed is:
1. A turning driving device, comprising:
   a directional motor comprising a rotation shaft rotatable vertically;
   a wheel hub motor module disposed on the directional motor and comprising at least one roller configured to rotate about a horizontal fixed axle, and a fixing frame configured for the horizontal fixed axle to mounted thereon, wherein a bottom of the fixing frame is combined with the rotation shaft;
   a driving device disposed under the directional motor and comprising a control module, wherein the control module is electrically connected to the directional motor and the wheel hub motor module and configured to supply power to and control the rotation shaft and the roller to rotate, and when the control module outputs and transmits a control signal to the directional motor and the wheel hub motor module, the rotation shaft of the directional motor drives the fixing frame of the wheel hub motor module to horizontally turn to a preset angular position, and the wheel hub motor module drives the roller to vertically rotate, so as to drive an article placed thereon to move toward a predetermined direction; and
   a base, wherein a bottom of the directional motor is combined with the base, and the base has a pass hole formed thereon, and a lower part of the rotation shaft is inserted through the pass hole to combine with a shaft anti-drop component.

2. The turning driving device according to claim 1, further comprising a motor control box combined with a bottom of the base, and a control module mounted inside the motor control box.

3. The turning driving device according to claim 1, wherein the fixing frame of the wheel hub motor module comprises a bottom plate disposed on a bottom of the fixing frame, and the bottom plate has a fixing hole formed on a central part thereof and configured to combine with the rotation shaft, and the fixing frame comprises two side plates upwardly extended from two sides of the bottom plate, and each of the two side plates has a locating hole, and two ends of the fixed axle surrounded by a center of the roller are mounted in the locating holes, respectively.

4. The turning driving device according to claim 3, wherein two ends of the fixed axle are mounted in the locating holes on the side plates by shaft locking components, respectively.

5. The turning driving device according to claim 3, further comprising a dust-proof cover combined on the fixing frame, wherein the dust-proof cover has an exposure hole configure to expose a part of the roller.

6. The turning driving device according to claim 1, further comprising a dust-proof cover and a quick release motor housing, wherein the dust-proof cover is combined on the fixing frame of the wheel hub motor module and has an exposure hole configured to expose a part of the roller, and the quick release motor housing is configured to cover outer sides of the directional motor and the wheel hub motor module and has an accommodation hole formed on a top thereof and configured to expose the dust-proof cover.

7. The turning driving device according to claim 6, further comprising a base combined with a bottom of the directional motor, wherein the base has a pass hole configured for a lower part of a rotation shaft 11 to pass, and the quick release motor housing has an opening formed on a bottom thereof and configured to combine with a top of the base.

* * * * *